United States Patent
Sybert et al.

(10) Patent No.: US 10,377,876 B2
(45) Date of Patent: Aug. 13, 2019

(54) THERMOPLASTIC COMPOSITIONS, METHOD OF MANUFACTURE, AND ARTICLES THEREFROM

(71) Applicant: SABIC GLOBAL TECHNOLOGIES B.V., Bergen Op Zoom (NL)

(72) Inventors: Paul Dean Sybert, Evansville, IN (US); Yogesh Omprakash Sharma, Maharashtra (IN)

(73) Assignee: SABIC GLOBAL TECHNOLOGIES B.V., Bergen Op Zoom (NL)

(*) Notice: Subject to any disclaimer, the term of this patent is extended or adjusted under 35 U.S.C. 154(b) by 97 days.

(21) Appl. No.: 15/529,175

(22) PCT Filed: Nov. 24, 2015

(86) PCT No.: PCT/US2015/062322
§ 371 (c)(1),
(2) Date: May 24, 2017

(87) PCT Pub. No.: WO2016/085928
PCT Pub. Date: Jun. 2, 2016

(65) Prior Publication Data
US 2017/0355832 A1 Dec. 14, 2017

Related U.S. Application Data

(60) Provisional application No. 62/084,140, filed on Nov. 25, 2014.

(51) Int. Cl.

| | |
|---|---|
| *C08K 5/3432* | (2006.01) |
| *C08K 5/3437* | (2006.01) |
| *C08K 5/3475* | (2006.01) |
| *C08L 83/10* | (2006.01) |
| *C08G 73/10* | (2006.01) |
| *C08L 79/08* | (2006.01) |
| *B32B 27/06* | (2006.01) |
| *C08G 63/695* | (2006.01) |
| *C08K 5/523* | (2006.01) |
| *C08G 77/448* | (2006.01) |

(52) U.S. Cl.
CPC ............ *C08K 5/3432* (2013.01); *B32B 27/06* (2013.01); *C08G 63/6956* (2013.01); *C08G 73/1053* (2013.01); *C08K 5/3437* (2013.01); *C08K 5/3475* (2013.01); *C08L 79/08* (2013.01); *C08L 83/10* (2013.01); *B32B 2309/105* (2013.01); *C08G 77/448* (2013.01); *C08K 5/523* (2013.01)

(58) Field of Classification Search
None
See application file for complete search history.

(56) References Cited

U.S. PATENT DOCUMENTS

| | | | |
|---|---|---|---|
| 3,972,902 | A | 8/1976 | Heath et al. |
| 4,455,410 | A | 6/1984 | Giles, Jr. |
| 4,493,915 | A | 1/1985 | Lohmeijer |
| 4,600,647 | A | 7/1986 | Robeson et al. |
| 4,959,449 | A | 9/1990 | Stautzenberger et al. |
| 6,228,910 | B1 * | 5/2001 | Shakhnovich ....... C08K 5/0041 524/88 |
| 6,410,620 | B2 | 6/2002 | Shakhnovich |
| 6,414,058 | B2 | 7/2002 | Shakhnovich |
| 6,583,256 | B2 | 6/2003 | Vollenberg et al. |

(Continued)

FOREIGN PATENT DOCUMENTS

| | | |
|---|---|---|
| EP | 0303988 A2 | 2/1989 |
| EP | 0524731 A1 | 1/1993 |

(Continued)

OTHER PUBLICATIONS

Stoyanova et al. Chemical Physics 279 2002 1_6.*

(Continued)

*Primary Examiner* — Robert T Butcher
(74) *Attorney, Agent, or Firm* — Cantor Colburn LLP

(57) ABSTRACT

A thermoplastic composition including a polycarbonatesiloxane-arylate; a phthalone compound; and optionally an additional component different from the polycarbonatesiloxane-arylate and the phthalone compound; wherein the phthalone compound has a formula: wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ are independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2 and is a single bond or a divalent organic radical bonded to the $Z_1$ ring structure through an ether, ketone, or thio linkage.

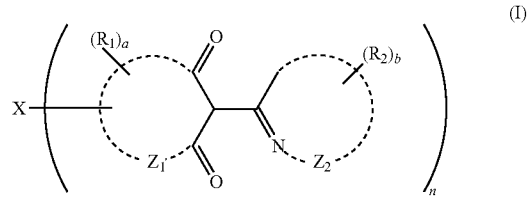

20 Claims, No Drawings

(56) References Cited

U.S. PATENT DOCUMENTS

| | | | |
|---|---|---|---|
| 6,607,814 | B2 | 8/2003 | Pickett et al. |
| 6,775,059 | B2 | 8/2004 | Kuwabara |
| 7,655,085 | B2 | 2/2010 | Shankarling et al. |
| 7,695,815 | B2 | 4/2010 | Argawal et al. |
| 7,709,581 | B2 | 5/2010 | Glasgow et al. |
| 7,790,292 | B2 | 9/2010 | Colborn et al. |
| 8,545,988 | B2 | 10/2013 | Yamaguchi et al. |
| 8,969,447 | B2 | 3/2015 | Van Der Mee et al. |
| 9,352,755 | B2 | 5/2016 | Van Der Mee et al. |
| 2005/0260369 | A1 | 11/2005 | Graf et al. |
| 2006/0264582 | A1 | 11/2006 | Mullen et al. |
| 2007/0027271 | A1 | 2/2007 | Davis et al. |
| 2007/0100088 | A1 | 5/2007 | Gallucci et al. |
| 2007/0149629 | A1 | 6/2007 | Donovan et al. |
| 2007/0155913 | A1 | 7/2007 | Chakravarti et al. |
| 2008/0269386 | A1 | 10/2008 | Chakravarti et al. |
| 2012/0059078 | A1 | 3/2012 | Kim et al. |
| 2012/0208110 | A1 | 8/2012 | Burns et al. |
| 2012/0252961 | A1 | 10/2012 | Sybert et al. |
| 2012/0267480 | A1 | 10/2012 | Sybert et al. |
| 2013/0224462 | A1* | 8/2013 | van der Mee ......... C09K 21/14 428/220 |
| 2014/0295363 | A1 | 10/2014 | Sun et al. |
| 2014/0326163 | A1 | 11/2014 | Van Der Mee et al. |
| 2014/0329940 | A1 | 11/2014 | Van Der Mee et al. |
| 2014/0357768 | A1 | 12/2014 | Sharma et al. |
| 2016/0002429 | A1 | 1/2016 | Donea et al. |
| 2017/0283612 | A1 | 10/2017 | Sybert et al. |
| 2017/0306147 | A1 | 10/2017 | Sharma et al. |

FOREIGN PATENT DOCUMENTS

| | | | |
|---|---|---|---|
| EP | 0653461 | A2 | 5/1995 |
| EP | 0872526 | A1 | 10/1998 |
| EP | 2423250 | A2 | 2/2012 |
| EP | 2426174 | A1 | 3/2012 |
| JP | 2003082201 | A | 3/2003 |
| JP | 2004345276 | A | 12/2004 |
| JP | 2006182980 | A | 7/2006 |
| WO | 0007812 | A1 | 2/2000 |
| WO | 0015718 | A1 | 3/2000 |
| WO | 0119921 | A1 | 3/2001 |
| WO | 2013130809 | A1 | 9/2013 |
| WO | 2013175448 | A1 | 11/2013 |
| WO | 2014072923 | A1 | 5/2014 |
| WO | 2014201086 | A2 | 12/2014 |
| WO | 2015106204 | A1 | 7/2015 |
| WO | 2015153483 | A1 | 10/2015 |
| WO | 2016085790 | A1 | 6/2016 |
| WO | 2016085928 | A1 | 6/2016 |

OTHER PUBLICATIONS

Natarajan et al. Photochem Photobiol. Mar.-Apr. 2012 88(2):250_6.*
Japanese Patent No. 2003082201; Date of Publication: Mar. 19, 2003; Abstract Only, 1 Page.
Japanese Patent No. 2006182980; Date of Publication: Jul. 13, 2006; Abstract Only, 1 Page.
Natarajan, Arunkumar, et al., "Pyrophthalones as Blue Wavelength Absorbers in Thermoplastic Media", Photochemistry and Photobiology, 2011, The American Society of Photobiology 0031-8655/11, pp. 1-7.
Jingzhen, "Foam Molding Principle," Chemical Industry Press, Aug. 2005, pp. 49.
Zhao et al., "Polymer Processing Engineering," China Light Industry Press, Polymer Materials and Engineering Series, Mar. 2001, pp. 393.
International Search Report for International Application No. PCT/US2015/062322; International Filing Date Nov. 24, 2015; dated Feb. 22, 2016; 7 pages.
Manukian et al., "Chinophthalone," Chimia, Schweizerische Chemische Gesellschaft, CH, vol. 24, No. 9, Sep. 1, 1970; pp. 328-339.
Neiland et al.; "Phthalones and Their Structural Analogs (Review)"; Chemistry of Heterocyclic Componds; Apr. 1, 1975; pp. 381-395.
Written Opinion of the International Search Report for International Application No. PCT/US2015/062322; International Filing Date Nov. 24, 2015; dated Feb. 22, 2016; 10 pages.
Haper et al.; "Plastics Materials and Processes: A Concise Encyclopedia"; 2003, p. 415.

* cited by examiner

THERMOPLASTIC COMPOSITIONS, METHOD OF MANUFACTURE, AND ARTICLES THEREFROM

CROSS REFERENCE TO RELATED APPLICATIONS

This application is a National Stage application of PCT/US15/62322, filed Nov. 24, 2015, which claims the benefit of U.S. Provisional Application No. 62/084,140, filed Nov. 25, 2014, both of which are incorporated by reference in their entirety herein.

BACKGROUND

This disclosure relates to thermoplastic compositions and in particular to low smoke, low heat release, and weatherable thermoplastic polymer compositions comprising polycarbonatesiloxane-arylate, methods of manufacture, and uses thereof.

Polycarbonates are useful in the manufacture of articles used in mass transportation such as trains, aircrafts, and buses. These applications have stringent flammability safety requirements that the polycarbonates must meet. Particular requirements include smoke density, flame spread, and heat release values.

A number of polycarbonate compositions have been able to pass the tests set forth for interior aircraft or train applications. However, these compositions may be susceptible to yellowing after light exposure, which can adversely impact the color stability performance of the compositions. This yellowing phenomenon, sometimes referred to as photoyellowing, has been difficult to address with known techniques and materials, especially for some colors and some shades of some colors. Accordingly, there is a need for materials that can meet the stringent fire safety requirements, yet provide color stability across a variety of targeted color specifications.

SUMMARY

A thermoplastic composition comprises a polycarbonate-siloxane-arylate; a phthalone compound; and optionally an additional component different from the polycarbonatesiloxane-arylate and the phthalone compound; wherein the phthalone compound has a formula

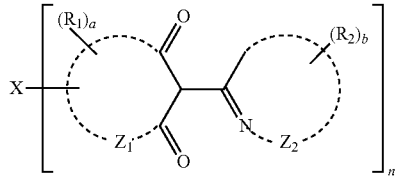

wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ are independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2, and is a single bond or a divalent organic radical bonded to the $Z_1$ ring structure through an ether, ketone, or thio linkage.

A method of manufacture of the thermoplastic compositions comprises extruding or melt-blending the components of the thermoplastic compositions to form the thermoplastic compositions.

In yet another embodiment, an article comprises the thermoplastic compositions, including a molded article, a thermoformed article, an extruded film, an extruded sheet, a foamed article, a layer of a multi-layer article, a substrate for a coated article, or a substrate for a metallized article. The article can be a transportation component.

A method of manufacture of an article comprises molding, extruding, foaming, or casting the above-described thermoplastic composition to form the article.

The above described and other features are exemplified by the following detailed description.

DETAILED DESCRIPTION

The inventors hereof have found that low smoke, low heat release, and weatherable compositions can be provided by adding a small amount of a phthalone compound to polycarbonatesiloxane-arylate. The compositions can further comprise a polycarbonate different from the polycarbonatesiloxane-arylate, a polyetherimide, an organic phosphorus compound, or a combination comprising at least one of the foregoing to further improve the smoke, heat release, or flow properties the compositions.

The polycarbonatesiloxane-arylates comprise repeating aromatic carbonate units, siloxane units, and aromatic ester (arylate) units. The carbonate units are repeating units of formula (1)

$$\mathrm{-R^1-O-\overset{O}{\underset{\|}{C}}-O-} \quad (1)$$

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

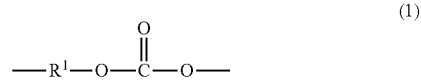

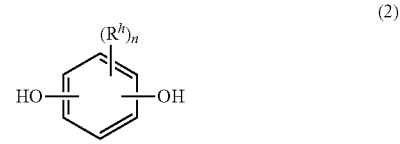

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of dihydroxy compounds that can be used are described, for example, in WO 2013/175448 A1, US 2014/0295363, and WO 2014/072923.

Specific dihydroxy compounds include resorcinol, 2,2-bis(4-hydroxyphenyl) propane ("bisphenol A" or "BPA", in which in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane (DMBPC), and 1,1-bis(4-hydroxy-3-methylphenyl)-3,3,5-trimethylcyclohexane (isophorone bisphenol).

In a specific embodiment, the polycarbonate units are bisphenol carbonate units of the formula (1a)

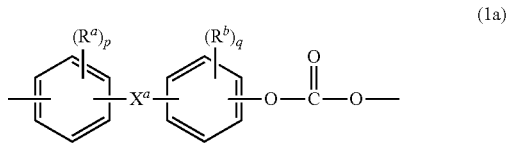

(1a)

wherein $R^a$ and $R^b$, $X^a$, p and q are as defined in formula (3). Specifically, the carbonate units are derived from bisphenol-A, in which each of $A^1$ and $A^2$ is p-phenylene and $Y^1$ is isopropylidene in formula (1a). Such units are referred to herein as "bisphenol A carbonate units."

The polycarbonatesiloxane-arylate further comprises arylate units, i.e., ester units based on an aromatic dicarboxylic acid repeating ester units of formula (4)

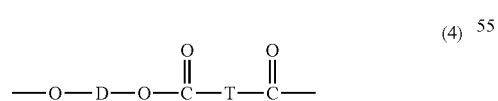

(4)

wherein D is a divalent group derived from a dihydroxy compound, and can be, for example, a $C_{6-20}$ alicyclic group or a $C_{6-20}$ aromatic group; and T is a divalent $C_{6-20}$ arylene group. In an embodiment, D is derived from a dihydroxy aromatic compound of formula (2), formula (3), or a combination comprising at least one of the foregoing dihydroxy aromatic compounds. The D and T groups are desirably minimally substituted with hydrocarbon-containing substituents such as alkyl, alkoxy, or alkylene substituents. In an embodiment, less than 5 mol %, specifically less than or equal to 2 mol %, and still more specifically less than or equal to 1 mol % of the combined number of moles of D and T groups are substituted with hydrocarbon-containing substituents such as alkyl, alkoxy, or alkylene substituents.

Examples of aromatic dicarboxylic acids from which the T group in the ester unit of formula (4) is derived include isophthalic or terephthalic acid, 1,2-di(p-carboxyphenyl) ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99, or 80:20 to 20:80, or 60:40 to 40:60.

In an embodiment, the arylate units are derived from the reaction product of one equivalent of an isophthalic acid derivative and/or terephthalic acid derivative. In such an embodiment, the arylate units are of formula (5)

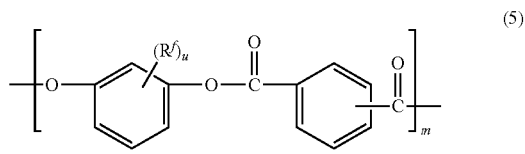

(5)

wherein each $R^f$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4, and m is greater than or equal to 4. In an embodiment, m is 4 to 100, 4 to 50, specifically 5 to 30, more specifically 5 to 25, and still more specifically 10 to 20. In another embodiment, the molar ratio of isophthalate to terephthalate can be about 0.25:1 to about 4.0:1. Preferred arylate units are isophthalate-terephthalate-resorcinol ester units, isophthalate-terephthalate-bisphenol ester units, or a combination comprising each of these, which can be referred to respectively as poly(isophthalate-terephthalate-resorcinol) ester units, poly(isophthalate-terephthalate-bisphenol-A) ester units, and poly[(isophthalate-terephthalate-resorcinol) ester-co-(isophthalate-terephthalate-bisphenol-A)] ester units.

In some embodiments, the carbonate units and the ester units are present as blocks of formula (6)

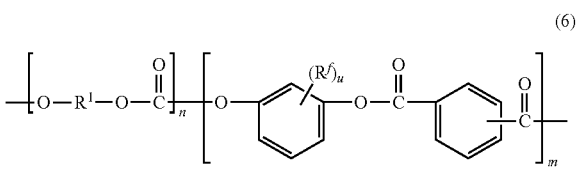

(6)

wherein $R^f$, u, and m are as defined in formula (5), each $R^1$ is independently a $C_{6-30}$ arylene group, and n is greater than or equal to one, for example 3 to 50, specifically from 5 to 25, and more specifically from 5 to 20. In an embodiment, m is 5 to 75 and n is 3 to 50, or m is 10 to 25 and n is 5 to 20, and the molar ratio of isophthalate units to terephthalate units is 80:20 to 20:80. In the foregoing embodiment, the preferred carbonate units are bisphenol A carbonate units, optionally together with resorcinol carbonate units, and the arylate units are poly(isophthalate-terephthalate-resorcinol) ester units, poly(isophthalate-terephthalate-bisphenol-A) ester units, and poly[(isophthalate-terephthalate-resorcinol) ester-co-(isophthalate-terephthalate-bisphenol-A)] ester units. In a specific embodiment, the carbonate and arylate units are present as a poly(isophthalate-terephthalate-resorcinol ester)-co-(resorcinol carbonate)-co-(bisphenol-A carbonate) segment.

The carbonate and arylate segments desirably comprise a minimum amount of saturated hydrocarbon present in the form of substituents or structural groups such as bridging groups or other connective groups. In an embodiment, less than or equal to 25 mol %, specifically less than or equal to 15 mol %, and still more specifically less than or equal to 10 mol % of the combined arylate units and carbonate units comprise alkyl, alkoxy, or alkylene groups. In another embodiment, the arylate ester units and the carbonate units are not substituted with non-aromatic hydrocarbon-containing substituents such as alkyl, alkoxy, or alkylene substituents.

The siloxane units of the polycarbonatesiloxane-arylates are present as polydiorganosiloxane (also referred to herein as "polysiloxane") blocks comprise repeating diorganosiloxane ("siloxane") units as in formula (7)

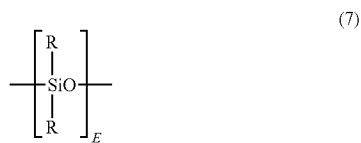

(7)

wherein each R is independently a $C_{1-13}$ monovalent hydrocarbon group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (7) can vary widely depending on the type and relative amount of each component in the copolymer and composition containing the copolymer, the desired properties of the composition, and like considerations. Generally, E has an average value of 2 to 1,000, specifically 2 to 500, 2 to 200, or 2 to 125, 5 to 80, or 10 to 70. In an embodiment, E has an average value of 10 to 80 or 10 to 40, and in still another embodiment, E has an average value of 40 to 80, or 40 to 70. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

In an embodiment, the siloxane blocks are of formula (8)

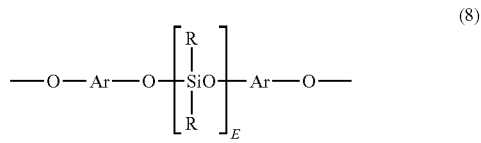

(8)

wherein E is as defined in formula (7); each R can be the same or different, and is as defined above; and Ar can be the same or different, and is a substituted or unsubstituted $C_6$-$C_{30}$ arylene, wherein the bonds are directly connected to an aromatic moiety. The Ar groups in formula (8) can be derived from a $C_6$-$C_{30}$ dihydroxyarylene compound, for example a dihydroxyarylene compound of formula (2) or formula (3). Specific dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the Ar group is derived from resorcinol.

In another embodiment, polydiorganosiloxane blocks are of formula (9)

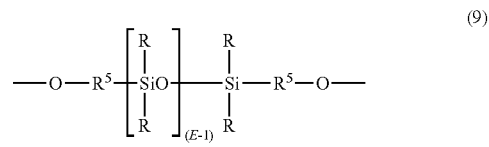

(9)

wherein R and E are as described in formula (7), and each $R^5$ is independently a divalent $C_1$-$C_{30}$ organic group, specifically a $C_{2-14}$ hydrocarbylene group, and wherein the polymerized polysiloxane unit is the reaction residue of its corresponding dihydroxy compound. In a specific embodiment, the polydiorganosiloxane blocks are of formula (10):

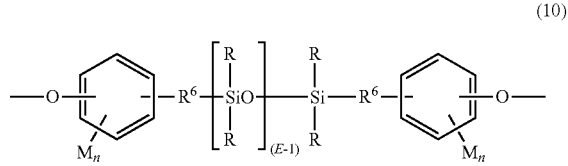

(10)

wherein R and E are as defined above. $R^6$ in formula (10) is a divalent $C_2$-$C_8$ aliphatic. Each M in formula (10) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, M is methoxy, n is one, and R6 is a divalent $C_1$-$C_3$ aliphatic group. Specific siloxane blocks are of the formula

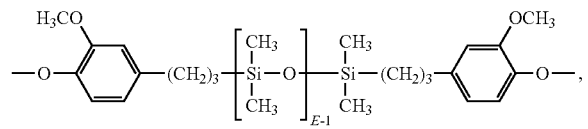
(10a)

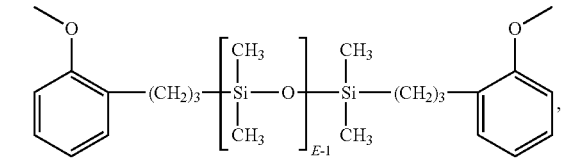
(10b)

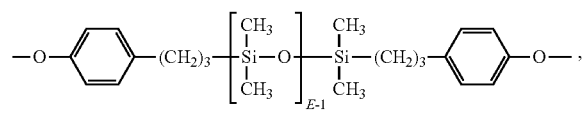
(10c)

or a combination comprising at least one of the foregoing, wherein E has an average value of 2 to 200, 2 to 125, 5 to 125, 5 to 100, 5 to 50, 20 to 80, or 5 to 20.

Blocks of formula (10) can be derived from the corresponding dihydroxy polydiorganosiloxane, which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenyl-phenol, 2-methyl-4-propylphenol, 2-allyl-4,6-dimethylphe-nol, 2-allyl-4-bromo-6-methylphenol, 2-allyl-6-methoxy-4-methylphenol and 2-allyl-4,6-dimethylphenol. The polysiloxane units can then be endcapped, with resorcinol or bisphenol A, for example, by the synthetic procedures of European Patent Application Publication No. 0 524 731 A1 of Hoover. The endcapped polysiloxane can the form an ester-linked structure with a carboxylic acid derivative during formation of the polycarbonatesiloxane-arylate, or a carbonate-linked structure by copolymerization with a carbonate precursor such as chloroformate, or a combination of such structures.

The polycarbonatesiloxane-arylate can be manufactured by methods that have been described in U.S. Pat. No. 7,790,292. All types of end groups are contemplated as being useful, e.g., phenol, cyanophenol, or para-cumyl phenol, provided that such end groups do not significantly affect desired properties of the thermoplastic compositions.

In an embodiment, the polycarbonatesiloxane-arylate comprises siloxane units in an amount of 0.5 to 20 mol %, specifically 1 to 10 mol % siloxane units, based on the combined mole percentages of siloxane units, arylate ester units, and carbonate units, and provided that siloxane units are provided by polysiloxane units covalently bonded in the polymer backbone of the polycarbonatesiloxane-arylate.

The polycarbonatesiloxane-arylate comprises siloxane units in an amount of 0.1 to 25 weight percent (wt %). In an embodiment, the polycarbonatesiloxane-arylate comprises siloxane units in an amount of 0.2 to 10 wt %, specifically 0.2 to 6 wt %, more specifically 0.2 to 5 wt %, and still more specifically 0.25 to 2 wt %, based on the total weight of the polycarbonatesiloxane-arylate, with the proviso that the siloxane units are provided by polysiloxane units covalently bonded in the polymer backbone of the polycarbonatesiloxane-arylate; 50 to 99.6 wt % arylate units, and 0.2 to 49.8 wt % carbonate units, wherein the combined weight percentages of the polysiloxane units, arylate units, and carbonate units is 100 wt % of the total weight of the polycarbonate-siloxane-arylate. In another embodiment, the polycarbonatesiloxane-arylate comprises 0.25 to 2 wt % polysiloxane units, 60 to 94.75 wt % arylate units, and 3.25 to 39.75 wt % carbonate units, wherein the combined weight percentages of the polysiloxane units, ester units, and carbonate units is 100 wt % of the total weight of the polycarbonate-siloxane-arylate.

The polycarbonatesiloxane-arylate can have a $T_g$ of 115 to 165° C., specifically 120 to 160° C., or 120 to 155° C. The polycarbonatesiloxane-arylate can have an intrinsic viscosity, as determined in chloroform at 25° C., of 0.3 to 1.5 deciliters per gram (dl/g), specifically 0.45 to 1.0 dl/g. The polycarbonatesiloxane-arylate can have a weight average molecular weight ($M_w$) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

The low smoke, low heat release, and weatherable thermoplastic compositions comprise the above-described polycarbonatesiloxane-arylates in combination with a phthalone compound. The polycarbonatesiloxane-arylates can be present in an amount of 30 to 99 wt %, 35 to 98 wt %, 40 to 98 wt %, 50 to 98 wt %, 60 wt % to 98 wt %, 70 wt % to 98 wt %, or 80 wt % to 98 wt %, based on the total weight of the thermoplastic composition.

The phthalone compound is of formula (11)

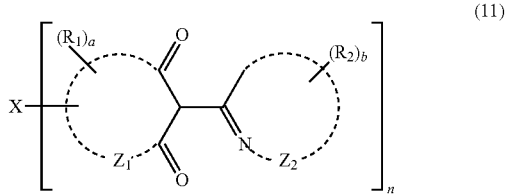
(11)

wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ can independently be halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2 and is a single bond or a divalent organic radical bonded to the $Z_1$ ring structure through an ether, ketone, or thio linkage.

More specifically, each $R_1$ and each $R_2$ can each independently be halogen, a $C_1$-$C_{18}$ alkyl group, a $C_6$-$C_{12}$ aryl group, a $C_1$-$C_{18}$ alkoxy group, a $C_6$-$C_{12}$ aryloxy group, an aromatic ($C_6$-$C_{12}$) or aliphatic ($C_1$-$C_{18}$) thioether group, an aromatic ($C_7$-$C_{13}$) or aliphatic ($C_2$-$C_{19}$) carboxylic acid ester group, or an aromatic ($C_6$-$C_{12}$) or aliphatic ($C_1$-$C_{18}$) amide group. In some, more specific, embodiments, each $R_1$ and each $R_2$ is independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group. Exemplary aromatic ring structures represented by $Z_1$ and $Z_2$ in formula (11) are depicted in the formulas below.

As mentioned above, X is present only if n=2, and is a single bond or a divalent organic radical bonded to the $Z_1$ ring structure through an ether, ketone, or thio linkage. Examples of divalent radicals for X include

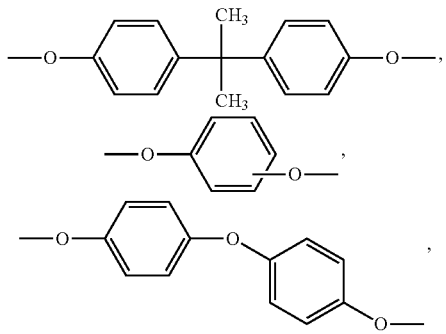

and their thioether analogs.

In some embodiments, the phthalone compound is of formula (16a) or (16b)

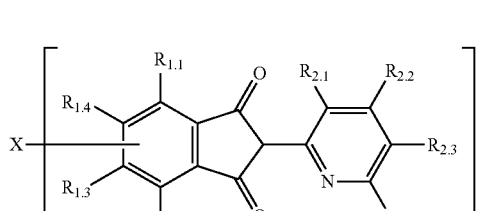

(16a)

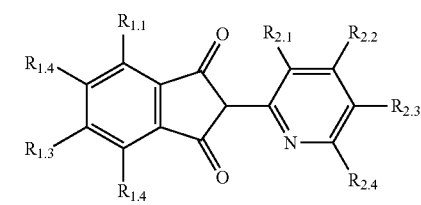

(16b)

wherein $R_{1.1}$, $R_{1.2}$, $R_{1.3}$, $R_{1.4}$, $R_{2.1}$, $R_{2.2}$, and $R_{2.3}$, are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, and in formula (16b) n and X are as in formula (16), and X is present in place of one of $R_{1.1}$, $R_{1.2}$, $R_{1.3}$, or $R_{1.4}$ when n is 2.

In some embodiments, the phthalone compound is of formula (16c) or (16d)

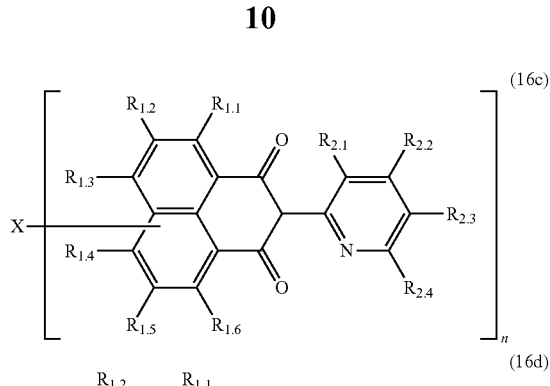

(16c)

(16d)

wherein $R_{1.1}$, $R_{1.2}$, $R_{1.3}$, $R_{1.4}$, $R_{1.5}$, $R_{1.6}$, $R_{2.1}$, $R_{2.2}$, and $R_{2.3}$, are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, and in formula (16d), n and X are as formula (16), and X is present in place of one of $R_{1.1}$, $R_{1.2}$, $R_{1.3}$, $R_{1.4}$, $R_{1.5}$, or $R_{1.6}$, when n is 2.

In some embodiments, the phthalone compound is of formula (16e) or (16f)

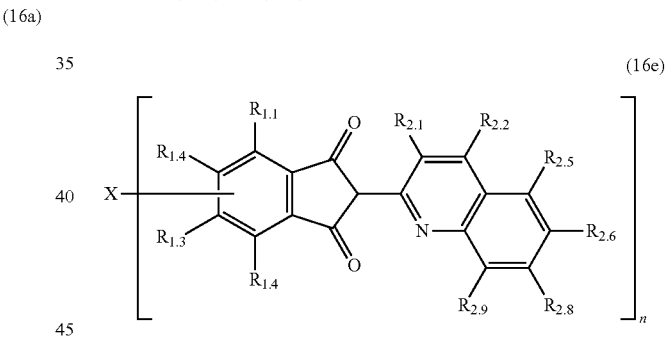

(16e)

(16f)

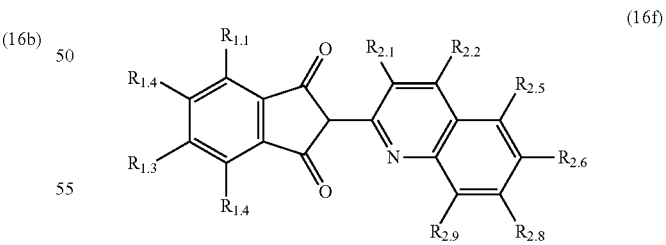

wherein $R_{1.1}$, $R_{1.2}$, $R_{1.3}$, $R_{1.4}$, $R_{2.1}$, $R_{2.2}$, $R_{2.5}$, $R_{2.6}$, $R_{2.7}$, $R_{2.8}$, and $R_{2.9}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, and n and X are as in formula (16f), and X is present in place of one of $R_{1.1}$, $R_{1.2}$, $R_{1.3}$, or $R_{1.4}$ when n is 2.

In some embodiments, the phthalone compound is represented by formula (16g) or (16h)

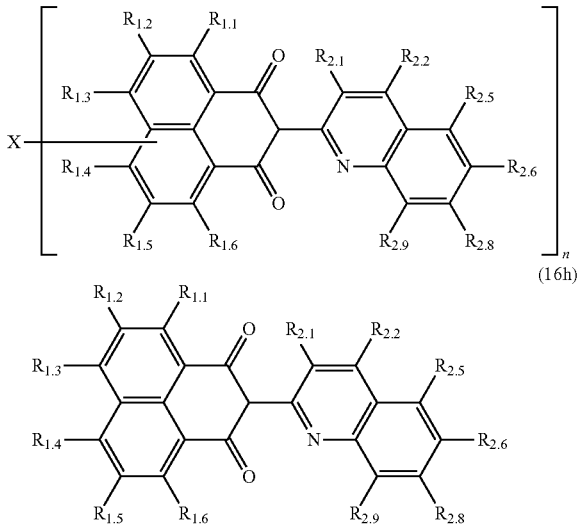

wherein $R_{1.1}$, $R_{1.2}$, $R_{1.3}$, $R_{1.4}$, $R_{2.1}$, $R_{2.2}$, $R_{2.5}$, $R_{2.6}$, $R_{2.7}$, $R_{2.8}$, and $R_{2.9}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, and n and X are as in formula (16), and X is present in place of one of $R_{1.1}$, $R_{1.2}$, $R_{1.3}$, $R_{1.4}$, $R_{1.5}$, or $R_{1.6}$, when n is 2.

In some embodiments, the atoms $Z_1$ necessary to complete a 9-to-13-membered single or fused aromatic ring structure form a second phthalone structure, as shown in formula (16i)

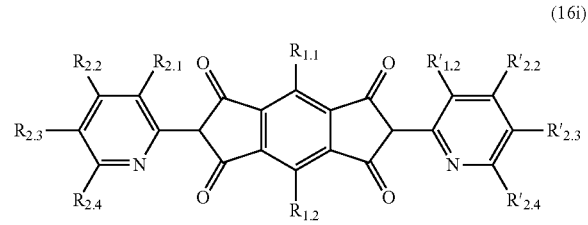

wherein $R_{1.1}$, $R_{1.2}$, $R_{2.1}$, $R_{2.2}$, $R_{2.3}$, $R_{2.4}$, $R'_{2.1}$, $R'_{2.2}$, $R'_{2.3}$, and $R'_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group. A quinoline ring can be present in place of the pyridine rings in formula (16i).

The phthalone compounds can be synthesized by well-known techniques, such as a condensation reaction of a substituted or unsubstituted phthalic anhydride (or phthalic anhydride derivative or analog such as of naphthalic anhydride or the anhydride of phenyl tetracarboxylic acid) with a substituted or unsubstituted 2-methylpyridine or a substituted or unsubstituted 2-methylquinoline. X linking groups can be derived from appropriate substituents on the anhydride compound.

The amount of phthalone compound can vary based on a number of factors such as the thickness of the fabricated article (particularly for transparent or translucent articles), whether or not an opacifier such as $TiO_2$ is present, and the color of the composition. Table 1 shows representative loadings of the phthalone compound as weight percentages based on the total polyaryl ester blend weight.

TABLE 1

| Article thickness (mm) | Loading levels (wt %) | Loading levels (preferred) (wt %) | Loading Levels (most preferred) (wt %) |
| --- | --- | --- | --- |
| 0.035-0.49 | 0.0001-1 | 0.001-0.1 | 0.01-0.05 |
| 0.5-1.49 | 0.0001-0.1 | 0.0001-0.01 | 0.0001-0.005 |
| 1.5-2.49 | 0.0001-0.1 | 0.0001-0.01 | 0.0001-0.005 |
| 2.5-3 | 0.0001-0.1 | 0.0001-0.01 | 0.0001-0.005 |

The phthalone compound is present in an amount of 0.0001 wt % to 1 wt %, preferably 0.001 wt % to 0.14 wt %, most preferably 0.01 wt % to 0.1 wt %, or 0.02 wt % to 0.08 wt %, each based on the total weight of the polymers in the composition. Different loading levels can be used when an opacifier such as $TiO_2$ is present. In some embodiments, the opacifier, preferably $TiO_2$, is present in an amount of 0.1 wt % to 15 wt %, preferably 0.2 wt % to 5 wt %, more preferably 0.5 wt % to 2 wt %, each based on the total weight of the polymers in the composition.

The relationship between an optimal amount of phthalone and the thickness of a desired article can be determined, for example, by the following steps. A series of compositions having varying amounts of phthalone dye are prepared, where the amount of phthalone in the compositions ranges from below to above the expected target levels of phthalone. The compositions are molded into chips having varying thicknesses spanning the target thickness, for example, in a range extending from lower than to higher than the desired thickness. Color measurements are performed on each of the samples before and after exposure, specifically measuring the color shift. The color vector of interest, for example, delta E, delta a, and delta b (DE, Da, and Db, respectively), can be plotted for each thickness, and the equation of the line can be derived from the plot. The optimal level of phthalone dye can be determined from the line, by setting the color shift of the aforementioned equation equal to zero. The optimal dye loadings can be plotted against article thickness, with the equation of the line derived from this plot describing the optimal phthalone dye loading for an article of a given thickness.

Without being bound by theory, it is believed that the favorable results obtained herein, i.e., weatherable polycarbonatesiloxane-arylate thermoplastic compositions, are provided from the phthalone dyes that are sufficiently thermally stable to withstand polycarbonatesiloxane-arylate processing temperatures, while offering an exposure-induced decrease in absorbance (i.e., photobleaching) that is complementary, in wavelength range (e.g., 400 to 450 nm), amount of decrease in absorbance, and/or rate of decrease in absorbance, with the increase in the visible absorbance (i.e., photoyellowing) experienced by polycarbonatesiloxane-arylate compositions.

In some embodiments, the thermoplastic composition exhibits color stability wherein a 35 micrometer thick film of the thermoplastic composition exhibits a change in $\Delta E$ value of the CIE1976 L*, a*, b* color system (as used herein, "$\Delta E$" refers to $\Delta E^*_{ab}$ as determined according to ISO 11664-4:2008(E)/CIE S 014-4/E:2007, with color measurements made according to ASTM D2244-11, more specifically using a MACBETH ColorEye 7000 Spectrophotometer (with illuminant D65, observer angle of 10°, geometry-specular component included, calibration transmission mode), of less than or equal to 1.0 (more specifically ≤0.7, and even more specifically ≤0.5) after 252 kJ/m² of exposure according to accelerated weathering testing protocol of ASTM G-155-05a, as compared to fresh non-aged sample.

Color stability and amelioration of photoyellowing can be especially advantageous for colored thermoplastic compositions, and in some embodiments the thermoplastic composition exhibits CIE1976 L*, a*, b* values determined according to ASTM D2244-11 under the above-described conditions of an L* value of greater than 60 (more specifically greater than 65), an a* value of greater than or equal to −1, and a b* value of less than or equal to 1 (more specifically less than or equal to 0.5).

In some embodiments, the phthalone compound has a decomposition onset temperature, $T_d$, of at least 250° C., more specifically at least 270° C. as determined according to ASTM E2550-11 using a nitrogen or other inert atmosphere and temperature ramp of 20° C./min ranging from 25° C. to 800° C.

The thermoplastic compositions can further comprise a polycarbonate different from the polycarbonatesiloxane-arylate, a polyetherimide, an organic phosphorus compound, or a combination comprising at least one of the foregoing.

"Polycarbonate" as used herein means a polymer having repeating structural carbonate units of formula (1). The polycarbonate can comprise a polycarbonate homopolymer, a copolycarbonate, a poly(carbonate-arylate ester), a poly(carbonate-siloxane), or a combination comprising at least one of the foregoing.

Polycarbonate homopolymers include one type of carbonate units of formula (1). In a specific embodiment, the polycarbonate is a linear homopolymer derived from bisphenol A, in which each of $A^1$ and $A^2$ is p-phenylene and $Y^1$ is isopropylidene in formula (3). In another embodiment, the polycarbonate is a branched homopolymer derived from bisphenol A.

Copolycarbonates include two or more different types of carbonate units of formula (1), specifically, formula (1a), for example units derived from BPA and PPPBP (commercially available under the trade designation XHT from the Innovative Plastics division of SABIC); BPA and DMBPC (commercially available under the trade designation DMX from the Innovative Plastics division of SABIC); or BPA and isophorone bisphenol (commercially available under the trade name APEC from Bayer).

In addition to carbonate units (1), the poly(carbonate-arylate ester) copolymers contain repeating arylate ester units of formula (4) or (5) as described herein in the context of polycarbonatesiloxane-arylates.

In a specific embodiment, the poly(carbonate-arylate ester) is a poly(bisphenol A carbonate)-co-(bisphenol A-phthalate-ester) of formula (12a)

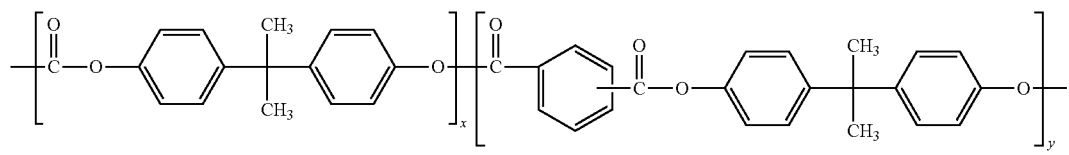

(12a)

wherein y and x represent the weight percent of arylate-bisphenol An ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (12a) comprising 35 to 45 wt % of carbonate units and 55 to 65 wt % of ester units, wherein the ester units have a molar ratio of isophthalate to terephthalate of 45:55 to 55:45 are often referred to as poly(carbonate-ester)s (PCE) and copolymers comprising 15 to 25 wt % of carbonate units and 75 to 85 wt % of ester units having a molar ratio of isophthalate to terephthalate from 98:2 to 88:12 are often referred to as poly(phthalate-carbonate)s (PPC).

In another embodiment, a specific polycarbonate copolymer is a poly(carbonate)-co-(monoaryl arylate ester) containing carbonate units (1) and repeating monoaryl arylate ester units of formula (5). These poly(carbonate)-co-(monoaryl arylate ester) copolymers are of formula (12b)

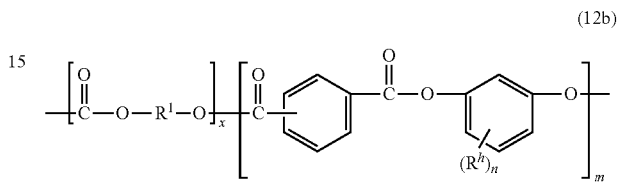

(12b)

wherein $R^1$ is as defined in formula (1) and $R^h$, and n are as defined in formula (5), and the mole ratio of x:m is 99:1 to 1:99, specifically 80:20 to 20:80, or 60:40 to 40:60.

Specifically, the monoaryl-arylate ester unit (5) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (13c)

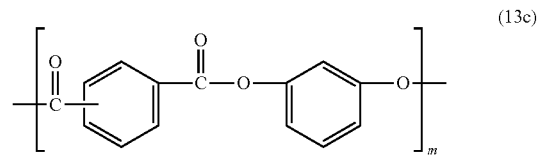

(13c)

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate)-co-(monoaryl arylate ester) is a poly(bisphenol A carbonate)-co-(isophthalate-terephthalate-resorcinol ester) of formula (12c)

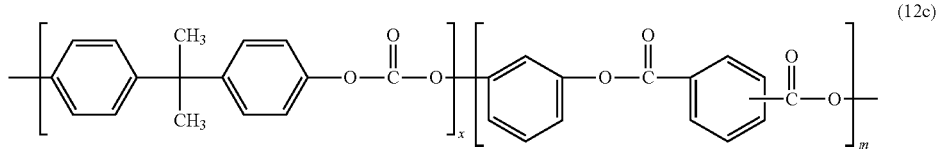
(12c)

wherein m is 4 to 100, 4 to 90, 5 to 70, more specifically 5 to 50, or still more specifically 10 to 30, and the mole ratio of x:m is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of formula (14) and bisphenol ester units of formula (13a):

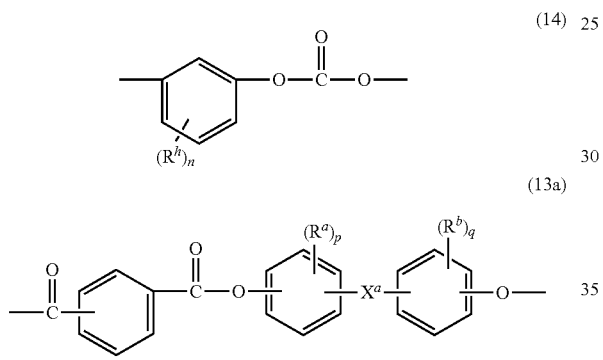

wherein, in the foregoing formulae, $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula

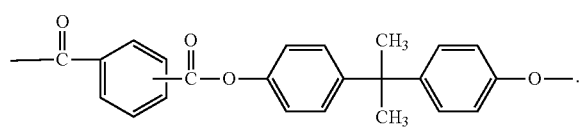

In an embodiment, poly(bisphenol A carbonate)-co-(isophthalate-terephthalate-resorcinol ester) (12c) comprises 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

Poly(carbonate-siloxane) copolymers comprise carbonate units (1), specifically (1a) and siloxane units (7), (8), (9), (10), (10a), (10b), or (10c). The polysiloxane-polycarbonate copolymers can comprise 50 to 99 weight percent of carbonate units and 1 to 50 weight percent siloxane units. Within this range, the polyorganosiloxane-polycarbonate copolymer can comprise 70 to 98 weight percent, more specifically 75 to 97 weight percent of carbonate units and 2 to 30 weight percent, more specifically 3 to 25 weight percent siloxane units.

The optional polycarbonate can be present in an amount of 0 to 70 wt %, 5 to 60 wt %, 5 to 50 wt., 5 to 40 wt %, 5 to 30 wt %, or 5 to 20 wt %, based on the total weight of the thermoplastic composition.

The polyetherimide in the thermoplastic composition is of formula (15)

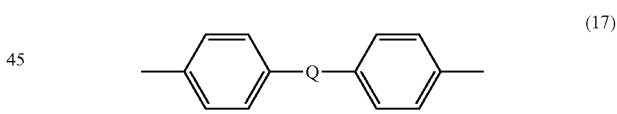

wherein R is a substituted or unsubstituted divalent organic group having 2 to 20 carbon atoms, for example a substituted or unsubstituted aromatic hydrocarbon group having 6 to 20 carbon atoms or a halogenated derivative thereof, a substituted or unsubstituted, straight or branched chain alkylene group having 2 to 20 carbon atoms, a substituted or unsubstituted cycloalkylene groups having 3 to 20 carbon atoms, or a divalent group of formula (17)

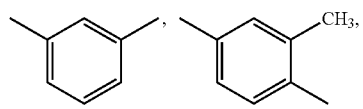

wherein Q is —O—, —S—, —C(O)—, —SO$_2$—, —SO—, or —C$_y$H$_{2y}$— wherein y is an integer from 1 to 5 or a halogenated derivative thereof.

The group Z in formula (15) is an aromatic $C_{6-24}$ monocyclic or polycyclic group optionally substituted with 1 to 6 $C_{1-8}$ alkyl groups, 1 to 8 halogen atoms, or a combination thereof, wherein the divalent bonds of the —O—Z—O— group are in the 3,3', 3,4', 4,3', or the 4,4' positions. In a specific embodiment, R is m-phenylene and Z is 2,2-bis(1', 4'-phenylene)isopropylidene.

In an embodiment, R in formula (15) is a divalent radical of one of the following formulas -continued

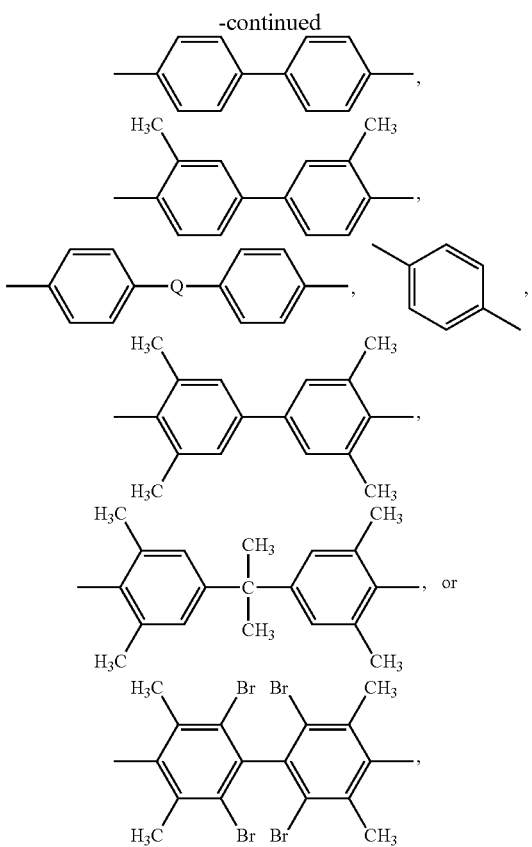

wherein Q is —O—, —S—, —C(O)—, —SO$_2$—, —SO—, or —C$_y$H$_{2y}$— wherein y is an integer from 1 to 5 or and a halogenated derivative thereof; and Z is a divalent group of formula (18)

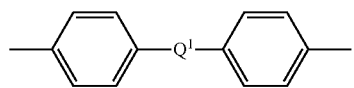

wherein Q$^1$ is —O—, —S—, —C(O)—, —SO$_2$—, —SO—, or —C$_y$H$_{2y}$— wherein y is an integer from 1 to 5. In an embodiment no halogen substituents are present in the polyetherimide.

Polyetherimides can be obtained by polymerization of an aromatic bisanhydride of formula

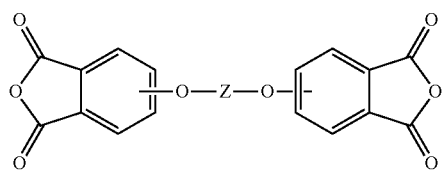

wherein Z is as described in formula (15), with a diamine of the formula H$_2$N—R—NH$_2$ wherein R is as described in formula (15). Examples of specific aromatic bisanhydrides and organic diamines are disclosed, for example, in U.S. Pat. Nos. 3,972,902 and 4,455,410. Illustrative examples of aromatic bisanhydrides and diamines are disclosed in U.S. Pat. No. 8,545,988. Aromatic diamines are often used, especially m- and p-phenylenediamine, sulfonyl dianiline, and combinations thereof.

The polyetherimide is present in an amount of 0 to 70 wt %, 5 to 60 wt %, 10 to 60 wt %, 10 to 30 wt %, 20 to 55 wt %, 30 to 55 wt %, or 40 to 55 wt %, based on the total weight of the thermoplastic composition.

The organophosphorus compounds in the thermoplastic composition include aromatic organophosphorus compounds having at least one organic aromatic group and at least one phosphorus-containing group, as well as organic compounds having at least one phosphorus-nitrogen bond. The organophosphorus compounds include those that have been described in U.S. Pat. No. 8,969,447.

Specific aromatic organophosphorus compounds have two or more phosphorus-containing groups, and are inclusive of acid esters of formula (20)

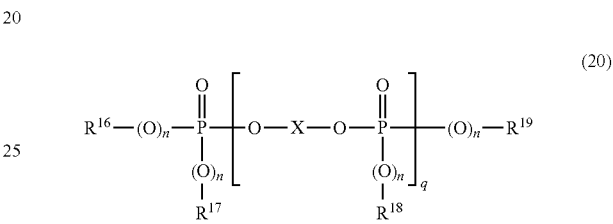

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl($C_{1-4}$)alkylene, or aryl groups optionally substituted by $C_{1-4}$ alkyl. Specific aryl moieties are cresyl, phenyl, xylenyl, propylphenyl, or butylphenyl. In some embodiments X in formula (20) is a mono- or poly-nuclear aromatic $C_{6-30}$ moiety derived from a diphenol. Further in formula (20), n is each independently 0 or 1; in some embodiments n is equal to 1. Also in formula (20), q is from 0.5 to 30, from 0.8 to 15, from 1 to 5, or from 1 to 2. Specifically, X can be represented by the following divalent groups (21), or a combination comprising one or more of these divalent groups

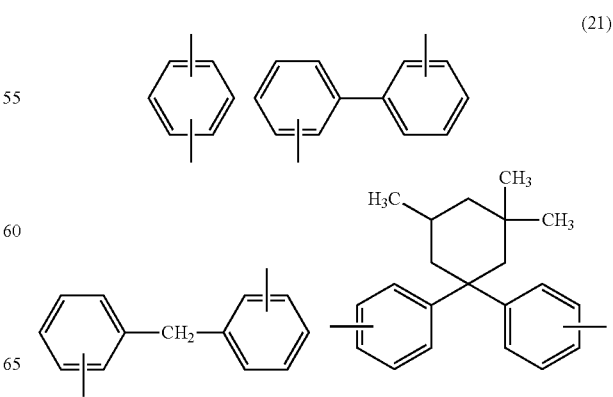

-continued

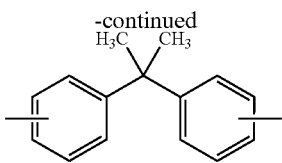

wherein the monophenylene and bisphenol-A groups can be specifically mentioned.

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol-A or resorcinol. In another embodiment, X is derived especially from resorcinol, hydroquinone, bisphenol-A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (22)

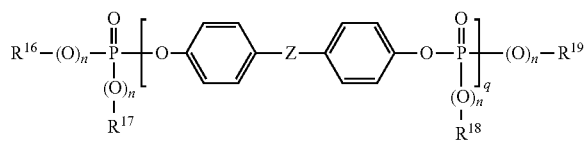

wherein $R^{16}$, $R^{17}$, $R^{18}$, $R^{19}$, n, and q are as defined for formula (20) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol-A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Accordingly, depending on the particular organophosphorus compound used, the thermoplastic compositions can comprise from 0 to 15 wt %, 1 to 15 wt %, 2 to 12 wt %, 0.3 to 8.5 wt %, or 0.5 to 8.0 wt %, or 3.5 to 7.5 wt % of the organophosphorus flame retardant, based on the total weight of the polymers in the thermoplastic composition. Specifically, the organophosphorus compounds can be bisphenol A bis(diphenyl phosphate), triphenyl phosphate, resorcinol bis (diphenyl phosphate), tricresyl phosphate, or a combination comprising at least one of the foregoing.

The thermoplastic composition can further include additives such as impact modifier(s). Impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like. For use in weatherable applications, it can be beneficial to use impact modifiers that have good UV resistance, such as acrylic and/or siloxane impact modifiers.

In addition to the polycarbonatesiloxane-arylate, phthalone, the optional polycarbonate, optional polyetherimide, optional organic phosphorus compound, and the optional impact modifier, the thermoplastic composition can include various additives ordinarily incorporated into polymer compositions of this type. Such additives can be mixed at a suitable time during the mixing of the components for forming the composition. Additives include fillers, reinforcing agents, antioxidants, heat stabilizers, light stabilizers (including ultraviolet (UV) light stabilizers), plasticizers, lubricants, mold release agents, antistatic agents, epoxides, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.01 to 5 wt %, based on the total weight of the composition.

The thermoplastic compositions can be manufactured by various methods. For example, powdered polymer, the phthalone compound, and/or other optional components are first blended, optionally with fillers in a HENSCHEL-Mixer* high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

As discussed above, the thermoplastic compositions are formulated to meet strict heat release and smoke density requirements. wherein a sample of the composition has at least one of the following properties: a flame time of less than 15 seconds, a burn length of less than 8 inches, and a drip distinguishing time of less than 5 seconds, each measure using the method of FAR 25-853(a)(l)(ii) at a thickness of 1.5 mm; an average peak smoke density within 4-minute equal to or less than 200 as regulated by FAR 25-853(d); an average peak smoke density within 4-minute equal to or less than 150 as regulated by airbus ABD0031/ATS1000; a smoke extracted from a NBS smoke chamber and measured by Draeger tube having an average concentration of the following gas components: HF<100 ppm, HCl<150 ppm, HCN<150 ppm, SO$_2$/H$_2$S<100 ppm, NO/NO$_2$<100 ppm, and CO<1000 ppm; and a 2 minute integrated heat release rate of less than or equal to 65 kilowatt-minutes per square meter (kW-min/m$^2$) and a peak heat release rate of less than 65 kilowatts per square meter (kW/m$^2$) as measured using the method according to Part IV, OSU Heat Release of FAR/JAR 25.853, Amendment 25-116.

In another embodiment, a sample of the thermoplastic composition has at least one of the following properties: a smoke density after 4 minutes (Ds-4) of equal to or less than 300 measured in accordance with ISO 5659-2 on a 3 mm thick plaque, an integral of the smoke density as a function of time up to 4 minutes (VOF4) of equal to or less than 600 measured in accordance with ISO 5659-2 on a 3 mm thick plaque at 50 kW/m$^2$, and a maximum average heat release (MAHRE) of equal to or less than 90 kW/m$^2$ measured in accordance with ISO 5660-1 on a 3 mm thick plaque at 50 kW/m$^2$.

Shaped, formed, or molded articles comprising the thermoplastic compositions are also provided. The thermoplastic compositions can be molded into useful shaped articles by a variety of means such as injection molding, extrusion, co-extrusion, solution casting, rotational molding, blow molding, and thermoforming to form articles. Thus the thermoplastic compositions can be used to form a foamed article, a molded article, a thermoformed article, an extruded film, an extruded sheet, a layer of a multi-layer article, e.g., a cap-layer, a substrate for a coated article, or a substrate for a metallized article. These values can be obtained in articles having a wide range of thicknesses, for example from 0.1 to 10 mm, or 0.5 to 5 mm.

Illustrative articles include seat components and claddings for train, aircraft, or bus interiors. As used herein, "claddings" means components that provide a surface of an article. Illustrative claddings include, for example, interior vertical surfaces, such as side walls, front walls, end-walls, partitions, room dividers, flaps, boxes, hoods, mirrors, lighting covers, a panel in an electrochromic window, an enclosure for an electronic device, a display screen, a protective cover for a display screen, a display unit, a television, a refrigerator door, a tray table, a trolley panel, a food cart, a magazine rack, and louvres; interior doors and linings for internal and external doors; window insulations, kitchen interior surfaces, interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens) and the like. In a specific embodiment, the claddings include, for example, a side wall, a front wall, an end-walls, a partition, a room divider, an interior door, a window insulation, a lining, a kitchen interior surface, a ceiling panel, an overhead or vertical luggage rack, a luggage container, a luggage compartment, a window frame, a (folding) table with downward facing surface, or an information display screen.

In an embodiment, the article is a window article comprising a sheet supported by a frame, wherein the sheet is molded, formed, or extruded from the thermoplastic composition. The sheet has a first side and a second opposite side, and the window article further comprises a first hard coat layer disposed on the first side and a second hard coat layer disposed on the second side. The article can further comprises a first ultraviolet light-blocking layer disposed between the first hard coat layer and the first side of the sheet, and a second ultraviolet light-blocking layer disposed between the second hard coat layer and the second side of the sheet.

In another embodiment, the article is a dust cover for a window comprising: an outer window and an inner window separated by a space; the dust cover separated from the inner window by a space, and a frame, wherein the outer window, inner window, and dust cover are secured in the frame such that the inner window is disposed between and is substantially coplanar with each of the dust cover and the outer window.

The article can be a mirror comprising: a layer molded, formed, or extruded from the thermoplastic polymer composition, a hard coat disposed on a surface of a first side of the layer, and an opacifying layer disposed on a surface of a second side of the layer opposite the first side. The opacifying layer is a metal layer. The article can further comprise a protective coat disposed on a surface of the opacifying layer opposite the layer molded, formed, or extruded from the thermoplastic polymer composition.

In another embodiment, a multilayer sheet or film comprising a base layer comprising the thermoplastic composition; and a cap layer disposed on a side of the base layer, wherein the cap layer comprises poly(ethylene terephthalate), poly(vinyl fluoride), poly(vinylidene fluoride), or a combination comprising at least one of the foregoing; wherein the multilayer sheet has at least of the following properties: a flame time of less than 15 seconds, a burn length of less than 6 inches, and a drip extinguishing time of less than 5 seconds, each measured using the method of FAR F25.5, in accordance with FAR 25.853(a) at a thickness of 3 mm; a 2 minute integrated heat release rate of less than or equal to 65 kilowatt-minutes per square meter (kW-min/m$^2$) and a peak heat release rate of less than 65 kilowatts per square meter (kW/m$^2$) as measured using the method according to Part IV, OSU Heat Release of FAR/JAR 25.853, Amendment 25-116; a maximum averaged rate of heat emission of less than or equal to 90 kW/m2 with 50 kW/m2 irradiance level test condition according to ISO 5660-1; or at a thickness of 1.0 mm, a smoke density of less than or equal to 200 after four minutes of burning according to ASTM E662-06.

Set forth below are specific embodiments of the disclosure.

Embodiment 1

A thermoplastic composition comprising a polycarbonatesiloxane-arylate; a phthalone compound; and optionally an additional component different from the polycarbonatesiloxane-arylate and the phthalone compound; wherein the phthalone compound has a formula (11) wherein $Z_1$ represents the atoms necessary to complete a 9- to 13-membered single or fused aromatic ring structure, $Z_2$ represents the atoms necessary to complete a pyridine or quinoline ring, each $R_1$ and each $R_2$ are independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group, a is an integer from 0 to 6, b is an integer from 0 to 4, n is 1 or 2, and X is present only if n=2, and is a single bond or a divalent organic radical bonded to the $Z_1$ ring structure through an ether, ketone, or thio linkage.

Embodiment 2

The thermoplastic composition of Embodiment 1, wherein the polycarbonatesiloxane-arylate comprises 0.2 to 10 wt % siloxane units, 50 to 99.6 wt % arylate units, and 0.2 to 49.8 wt % carbonate units, each based on the weight of the polycarbonatesiloxane-arylate.

Embodiment 3

The thermoplastic composition of Embodiment 2, wherein the carbonate units are bisphenol A carbonate units, resorcinol carbonate units, or a combination thereof; the arylate ester units are isophthalic acid-terephthalic acid-resorcinol units; and the siloxane units are of the formula (8), (9), or a combination comprising at least one of the foregoing siloxane units, wherein R is each independently a $C_{1-13}$ monovalent hydrocarbon group, Ar is each independently a $C_6$-$C_{30}$ arylene, $R^2$ is each independently a $C_{2-14}$ hydrocarbylene group, and E has an average value of 2 to 200.

Embodiment 4

The thermoplastic composition of Embodiment 2 or 3, wherein the siloxane units are of the formulas (10a), (10b), or (10c), or a combination comprising at least one of the foregoing, wherein E has an average value of 2 to 200.

Embodiment 5

The thermoplastic composition of Embodiment 2 or 3, wherein the siloxane units are of the formula (10a), (10b), (10c), or a combination comprising at least one of the foregoing, wherein E has an average value of 2 to 200.

Embodiment 6

The thermoplastic composition of any one of Embodiments 1 to 5, wherein the phthalone compound is according to the formula (16a) wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined in Embodiment 1, and X is present in place of one of $R_{1.1}$, $R_{1.2}$, $R_{1.3}$, or $R_{1.4}$ when n is 2.

Embodiment 7

The thermoplastic composition of any one of Embodiments 1 to 6, wherein the phthalone compound is according to the formula (16b) wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group.

Embodiment 8

The thermoplastic composition of any one of Embodiments 1 to 6, wherein the phthalone compound is according to the formula (16c) wherein $R_{1.1}$, $R_{1.2}$, $R_{1.3}$, $R_{1.4}$, $R_{1.5}$, $R_{1.6}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n and X are as defined in Embodiment 1, and X is present in place of one of $R_{1.1}$, $R_{1.2}$, $R_{1.3}$, $R_{1.4}$, $R_{1.5}$, or $R_{1.6}$, when n is 2.

Embodiment 9

The thermoplastic composition of any one of Embodiments 1 to 6, wherein the phthalone compound is

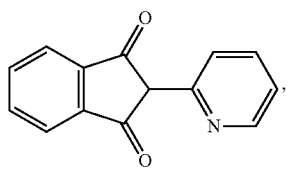

-continued

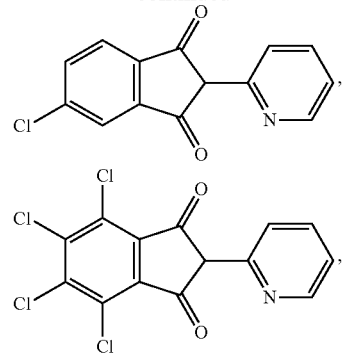

or a combination comprising at least one of the foregoing.

Embodiment 10

The thermoplastic composition of any one of Embodiments 1 to 9, comprising 0.0001 wt % to 1 wt %, preferably 0.001 wt % to 0.14 wt %, more preferably 0.01 wt % to 0.1 wt %, most preferably 0.02 wt % to 0.08 wt % of the phthalone compound, each based on the total weight of the thermoplastic compositions.

Embodiment 11

The thermoplastic composition of any one of Embodiments 1 to 10, wherein the phthalone compound exhibits photobleaching in the region of light from 400-450 nm.

Embodiment 12

The thermoplastic composition of any one of Embodiments 1 to 11, wherein the composition comprises the additional component; and wherein the additional component comprises a polycarbonate, a polyetherimide, an organophosphorus compound, or a combination comprising at least one of the foregoing.

Embodiment 13

The thermoplastic composition of Embodiment 12, wherein the polycarbonate comprises a polycarbonate homopolymer, a copolycarbonate, a poly(carbonate-arylate ester), a poly(carbonate-siloxane), or a combination comprising at least one of the foregoing.

Embodiment 14

The thermoplastic composition of Embodiment 13, wherein the poly(carbonate-arylate ester) is a poly(carbonate-monoaryl arylate ester) comprising repeating carbonate units of the formula (1a) wherein $R^a$ and $R^b$ are each independently are each independently $C_{1-12}$ alkyl, p and q are each independently integers of 0 to 4, and $X^a$ is a single bond, —O—, —S—, —S(O)—, —S(O)$_2$—, —C(O)—, or a $C_{1-18}$ organic group; and monoarylate ester units of the formula (5) wherein $R^h$ is each independently a halogen or $C_{1-10}$ hydrocarbon group, and n is 0 to 4.

Embodiment 15

The thermoplastic composition of Embodiment 14, wherein $R^a$ and $R^b$ are each independently a $C_{1-3}$ alkyl, p and q are each independently 0 or 1, $X^a$ is alkylidene of formula —C($R^c$)($R^d$)— wherein $R^c$ and $R^d$ are each $C_{1-6}$ alkyl, $R^h$ is a $C_{1-4}$ alkyl, and n is 0 or 1.

Embodiment 16

The thermoplastic composition of Embodiment 14 or 15, wherein the poly(carbonate-monoaryl arylate ester) is a poly(bisphenol-A carbonate)-co-poly(isophthalate-terephthalate-resorcinol), comprising 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

Embodiment 17

The thermoplastic composition of any one of Embodiments 12 to 16, wherein the composition further comprises 5 wt % to 60 wt %, based on the total weight of the polymers in the thermoplastic composition, a polyetherimide having the formula (15) wherein R is a $C_{2-20}$ hydrocarbon group, and Z is an aromatic $C_{6-24}$ monocyclic or polycyclic group optionally substituted with 1 to 6 $C_{1-8}$ alkyl groups, 1 to 8 halogen atoms, or a combination thereof, wherein the divalent bonds of the —O—Z—O— group are in the 3,3', 3,4', 4,3', or the 4,4' positions.

Embodiment 18

The thermoplastic composition of Embodiment 17, wherein R is m-phenylene and Z is 2,2-bis(1',4'-phenylene)isopropylidene.

Embodiment 19

The thermoplastic composition of any one of Embodiments 12 to 18, wherein the organophosphorus compound is an aromatic organophosphorus compound having at least one organic aromatic group and at least one phosphorus-containing group, or an organic compound having at least one phosphorus-nitrogen bond.

Embodiment 20

The thermoplastic composition of Embodiment 19, wherein the organophosphorus compound is bisphenol A bis(diphenyl phosphate), triphenyl phosphate, resorcinol bis(diphenyl phosphate), tricresyl phosphate, a phenol/bi-phenol polyphosphate, or a combination comprising at least one of the foregoing.

Embodiment 21

The thermoplastic composition of Embodiment 19, wherein organophosphorus compound containing a nitrogen-phosphorus bond is a phosphazene, phosphorus ester amide, phosphoric acid amide, phosphonic acid amide, phosphinic acid amide, tris(aziridinyl) phosphine oxide, a combination comprising at least one of the foregoing.

Embodiment 22

The thermoplastic composition of any one of Embodiments 12 to 21, wherein the organophosphorus compound is effective to provide phosphorus in an amount of 0.1% to 1.0% of phosphorus, based on the weight of the thermoplastic composition.

Embodiment 23

The thermoplastic composition of any one of Embodiments 1 to 22 wherein the composition comprises 0.01 wt % to 5 wt % of an additive composition comprising an additive selected from a processing aid, a heat stabilizer, an ultra violet light absorber, a colorant, or a combination comprising at least one of the foregoing, based on the total weight of the thermoplastic composition.

Embodiment 24

The thermoplastic composition of any one of Embodiments 1 to 23, wherein the thermoplastic composition further comprises 0.1 wt % to 15 wt % $TiO_2$, based on the total weight of the polymers in the composition.

Embodiment 25

The thermoplastic composition of any one of Embodiments 1 to 24, wherein a sample of the composition has at least one of the following properties: a flame time of less than 15 seconds, a burn length of less than 8 inches, and a drip distinguishing time of less than 5 seconds, each measure using the method of FAR 25-853(a)(1)(ii) at a thickness of 1.5 mm; an average peak smoke density within 4-minute equal to or less than 200 as regulated by FAR 25-853(d); an average peak smoke density within 4-minute equal to or less than 150 as regulated by airbus ABD0031/ATS1000; a smoke extracted from a NBS smoke chamber and measured by Draeger tube having an average concentration of the following gas components: HF<100 ppm, HCl<150 ppm, HCN<150 ppm, $SO_2/H_2S$<100 ppm, $NO/NO_2$<100 ppm, and CO<1000 ppm; and a 2 minute integrated heat release rate of less than or equal to 65 kilowatt-minutes per square meter (kW-min/$m^2$) and a peak heat release rate of less than 65 kilowatts per square meter (kW/$m^2$) as measured using the method according to Part IV, OSU Heat Release of FAR/JAR 25.853, Amendment 25-116.

Embodiment 26

The thermoplastic composition of any one of Embodiments 1 to 25, wherein a sample of the thermoplastic composition has at least one of the following properties: a smoke density after 4 minutes (Ds-4) of equal to or less than 300 measured in accordance with ISO 5659-2 on a 3 mm thick plaque, an integral of the smoke density as a function of time up to 4 minutes (VOF4) of equal to or less than 600 measured in accordance with ISO 5659-2 on a 3 mm thick plaque at 50 kW/$m^2$, and a maximum average heat release (MAHRE) of equal to or less than 90 kW/$m^2$ measured in accordance with ISO 5660-1 on a 3 mm thick plaque at 50 kW/$m^2$.

Embodiment 27

An article comprising the composition of any one of Embodiments 1 to 26, selected from a molded article, a thermoformed article, an extruded film, an extruded sheet, a foamed article, a layer of a multi-layer article, a substrate for a coated article, and a substrate for a metallized article.

Embodiment 28

The article of Embodiment 27, having a thickness of 0.1 to 10 mm.

Embodiment 29

The article of Embodiment 27 or 28 wherein the article is a transportation component.

Embodiment 30

The article of any one of Embodiments 27 to 29, selected from a train or aircraft interior component, wherein the component is a seat component, an interior vertical surface selected from side walls, front walls, end-walls, room dividers, partitions, flaps, boxes, hoods, mirrors, lighting covers, a panel in an electrochromic window, an enclosure for an electronic device, a display screen, a protective cover for a display screen, a display unit, a television, a refrigerator door, a tray table, a trolley panel, a food cart, a magazine rack, and louvres; an interior door or lining for internal and external doors; a window insulation; a kitchen interior surface; an interior horizontal surface selected from ceiling paneling, flaps, boxes, hoods and louvres; a luggage storage area selected from overhead and vertical luggage racks, luggage containers and compartments; a driver's desk application selected from paneling and surfaces of driver's desk; an interior surface of gangways selected from interior sides of gangway membranes (bellows) and interior linings; a window frame; an optionally folding table with downward facing surface; an interior or exterior surface of air ducts, or a device for passenger information.

Embodiment 31

The article of any one of Embodiments 27 to 30, wherein the article is a window article comprising a sheet supported by a frame, wherein the sheet is molded, formed or extruded from the thermoplastic composition.

Embodiment 32

The article of Embodiment 31, wherein the sheet has a first side and a second opposite side, and the window article further comprises a first hard coat layer disposed on the first side and a second hard coat layer disposed on the second side.

Embodiment 33

The article of Embodiment 32, further comprising a first ultraviolet light-blocking layer disposed between the first hard coat layer and the first side of the sheet, and a second ultraviolet light-blocking layer disposed between the second hard coat layer and the second side of the sheet.

Embodiment 34

The article of any one of Embodiments 27 to 30, wherein the article is a dust cover for a window, the window comprising: an outer window and an inner window separated by a space; the dust cover separated from the inner window by a space, and a frame, wherein the outer window, inner window, and dust cover are secured in the frame such that the inner window is disposed between and is substantially coplanar with each of the dust cover and the outer window.

Embodiment 35

The article of any one of Embodiments 27 to 30, wherein the component is a mirror, comprising: a layer molded, formed or extruded from the thermoplastic polymer composition, a hard coat disposed on a surface of a first side of the layer, and an opacifying layer disposed on a surface of a second side of the layer opposite the first side.

Embodiment 36

The article of Embodiment 35, wherein the opacifying layer is a metal layer.

Embodiment 37

The article of Embodiment 35 or 36, further comprising a protective coat disposed on a surface of the opacifying layer opposite the layer molded, formed, or extruded from the thermoplastic polymer composition.

Embodiment 38

A method of manufacture of an article, comprising molding, extruding, foaming, or casting the composition of any one of Embodiments 1 to 26.

Embodiment 39

A multilayer sheet or film comprising a base layer comprising a composition of Embodiments 1 to 26; and a cap layer disposed on a side of the base layer, wherein the cap layer comprises poly(ethylene terephthalate), poly(vinyl fluoride), poly(vinylidene fluoride), or a combination comprising at least one of the foregoing; wherein the multilayer sheet has at least of the following properties: a flame time of less than 15 seconds, a burn length of less than 6 inches, and a drip extinguishing time of less than 5 seconds, each measured using the method of FAR F25.5, in accordance with FAR 25.853(a) at a thickness of 3 mm; a 2 minute integrated heat release rate of less than or equal to 65 kilowatt-minutes per square meter ($kW\text{-}min/m^2$) and a peak heat release rate of less than 65 kilowatts per square meter ($kW/m^2$) as measured using the method according to Part IV, OSU Heat Release of FAR/JAR 25.853, Amendment 25-116; a maximum averaged rate of heat emission of less than or equal to 90 kW/m2 with 50 kW/m2 irradiance level test condition according to ISO 5660-1; or at a thickness of 1.0 mm, a smoke density of less than or equal to 200 after four minutes of burning according to ASTM E662-06.

As used herein, the singular forms "a," "an," and "the" include plural referents unless the context clearly dictates otherwise. "Or" means "and/or" unless clearly indicated otherwise. The modifier "about" used in connection with a quantity is inclusive of the stated value and has the meaning dictated by the context (e.g., includes the degree of error associated with measurement of the particular quantity). All ranges disclosed herein are inclusive of the endpoints, and the endpoints are independently combinable with each other. "Combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a C2-6 alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications, variations, improvements, and substantial equivalents.

The invention claimed is:

1. A thermoplastic composition comprising
a polycarbonatesiloxane-arylate;
0.001 wt % to 0.14 wt % of a phthalone compound based on the total weight of the thermoplastic composition; and
optionally an additional component different from the polycarbonatesiloxane-arylate and the phthalone compound;
wherein the phthalone compound has a formula:

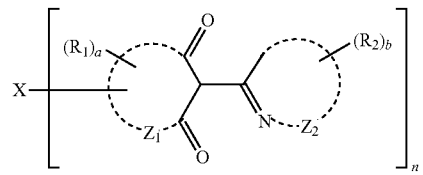

wherein
$Z_1$ represents the atoms necessary to complete a 9- to 13-membered single aromatic ring structure or a 9- to 13-membered fused aromatic ring structure,
$Z_2$ represents the atoms necessary to complete a pyridine or quinoline ring,
each $R_1$ and each $R_2$ are independently halogen, an alkyl group, an aryl group, a heterocyclic group, an alkoxy group, an aryloxy group, an aromatic or aliphatic thioether group, an aromatic or aliphatic carboxylic acid ester group, or an aromatic or aliphatic amide group,
a is an integer from 0 to 6,
b is an integer from 0 to 4,
n is 1 or 2, and
X is present only if n=2, and is a single bond or a divalent organic radical bonded to the $Z_1$ ring structure through an ether, ketone, or thio linkage.

2. The thermoplastic composition of claim 1, wherein the polycarbonatesiloxane-arylate comprises
0.2 to 10 wt % siloxane units,
50 to 99.6 wt % arylate units, and
0.2 to 49.8 wt % carbonate units,
each based on the weight of the polycarbonatesiloxane-arylate.

3. The thermoplastic composition of claim 2, wherein
the carbonate units are bisphenol A carbonate units, resorcinol carbonate units, or a combination thereof;
the arylate ester units are isophthalic acid-terephthalic acid-resorcinol units; and
the siloxane units are of the formula

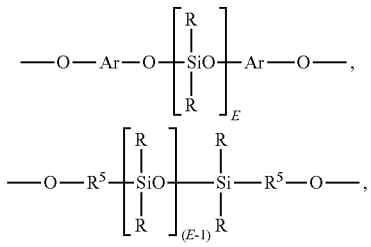

or a combination comprising at least one of the foregoing siloxane units, wherein R is each independently a $C_{1-13}$ monovalent hydrocarbon group, Ar is each independently a $C_6$-$C_{30}$ aromatic group, $R^5$ is each independently a $C_{2-14}$ hydrocarbylene group, and E has an average value of 2 to 200.

4. The thermoplastic composition of claim 2, wherein the siloxane units are of the formula

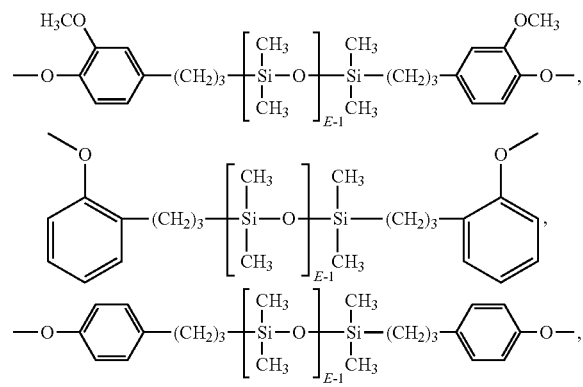

or a combination comprising at least one of the foregoing, wherein E has an average value of 2 to 200.

5. The thermoplastic composition of claim 1, wherein the phthalone compound is according to the formula:

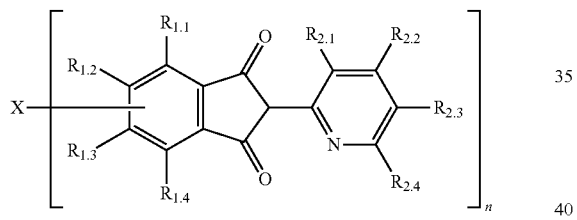

wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n is 1 or 2, and X is present in place of one of $R_{1.1}$, $R_{1.2}$, $R_{1.3}$, or $R_{1.4}$ when n is 2.

6. The thermoplastic composition of claim 1, wherein the phthalone compound is according to the formula

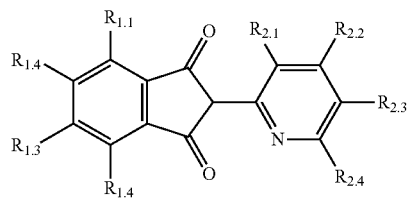

wherein $R_{1.1}$, $R_{1.2}$, $R_{1.3}$, $R_{1.4}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group.

7. The thermoplastic composition of claim 1, wherein the phthalone compound is according to the formula:

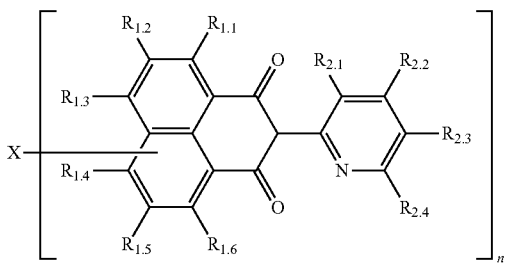

wherein $R_{1.1}$, $R_{1.2}$, $R_{1.3}$, $R_{1.4}$, $R_{1.5}$, $R_{1.6}$, $R_{2.1}$, $R_{2.2}$, $R_{2.3}$, and $R_{2.4}$ are each independently hydrogen, halogen, a $C_1$-$C_{18}$ alkyl group, a $C_6$-$C_{12}$ aryl group, a $C_1$-$C_{18}$ alkoxy group, or a $C_6$-$C_{12}$ aryloxy group, n is 1 or 2, and X is present in place of one of $R_{1.1}$, $R_{1.2}$, $R_{1.3}$, $R_{1.4}$, $R_{1.5}$, or $R_{1.6}$, when n is 2.

8. The thermoplastic composition of claim 1, wherein the phthalone compound is

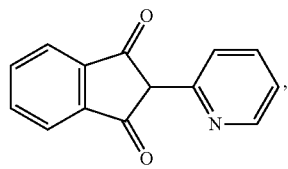

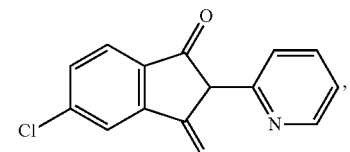

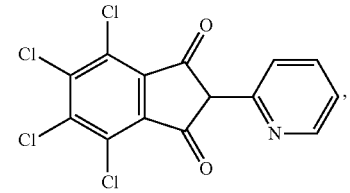

or a combination comprising at least one of the foregoing.

9. The thermoplastic composition of claim 1, comprising 0.02 to 0.08 wt. % of the phthalone compound, based on the total weight of the thermoplastic compositions.

10. The thermoplastic composition of claim 1, wherein the composition comprises the additional component; and wherein the additional component comprises a polycarbonate, a polyetherimide, an organophosphorus compound, or a combination comprising at least one of the foregoing.

11. The thermoplastic composition of claim 10, wherein the polycarbonate is a poly(carbonate-monoaryl arylate ester) comprising repeating carbonate units of the formula

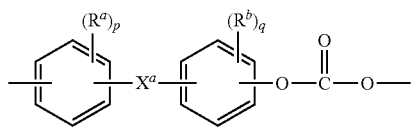

wherein
  $R^a$ and $R^b$ are each independently are each independently $C_{1-12}$ alkyl,
  p and q are each independently integers of 0 to 4, and
  $X^a$ is a single bond, —O—, —S—, —S(O)—, —S(O)$_2$—, —C(O)—, or a $C_{1-18}$ organic group; and
monoarylate ester units of the formula

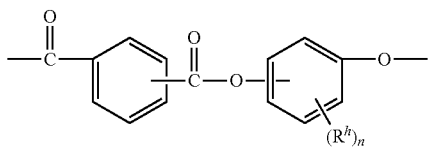

wherein
  $R^h$ is each independently a halogen or $C_{1-10}$ hydrocarbon group, and
  n is 0 to 4.

12. The thermoplastic composition of claim 11, wherein the poly(carbonate-monoaryl arylate ester) is a poly(bisphenol-A carbonate)-co-poly(isophthalate-terephthalate-resorcinol), comprising 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

13. The thermoplastic composition of claim 10, wherein the composition further comprises 5 wt % to 60 wt %, based on the total weight of the polymers in the thermoplastic composition, a polyetherimide having the formula

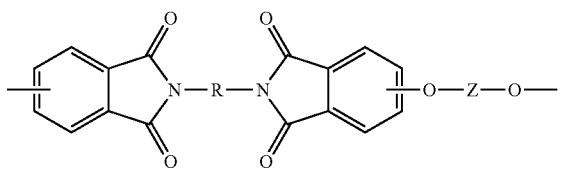

wherein
  R is a $C_{2-20}$ hydrocarbon group, and
  Z is an aromatic $C_{6-24}$ monocyclic or polycyclic group optionally substituted with 1 to 6 $C_{1-8}$ alkyl groups, 1 to 8 halogen atoms, or a combination thereof, wherein the divalent bonds of the —O—Z—O— group are in the 3,3', 3,4', 4,3', or the 4,4' positions.

14. The thermoplastic composition of claim 10, wherein the organophosphorus compound is an aromatic organophosphorus compound having at least one organic aromatic group and at least one phosphorus-containing group, or an organic compound having at least one phosphorus-nitrogen bond.

15. The thermoplastic composition of claim 1 wherein the composition comprises 0.01 wt % to 5 wt % of an additive composition comprising an additive selected from a processing aid, a heat stabilizer, an ultra violet light absorber, a colorant, or a combination comprising at least one of the foregoing, based on the total weight of the thermoplastic composition.

16. The thermoplastic composition of claim 1, wherein a sample of the composition has at least one of the following properties:
  i) a flame time of less than 15 seconds, a burn length of less than 8 inches, and a drip distinguishing time of less than 5 seconds, each measure using the method of FAR 25-853(a)(l)(ii) at a thickness of 1.5 mm;
  ii) an average peak smoke density within 4-minute equal to or less than 200 as regulated by FAR 25-853(d); an average peak smoke density within 4-minute equal to or less than 150 as regulated by airbus ABD0031/ATS1000;
  iii) a smoke extracted from a NBS smoke chamber and measured by Draeger tube having an average concentration of the following gas components: HF<100 ppm, HCl<150 ppm, HCN<150 ppm, $SO_2/H_2S$<100 ppm, $NO/NO_2$<100 ppm, and CO<1000 ppm;
  iv) a 2 minute integrated heat release rate of less than or equal to 65 kilowatt-minutes per square meter (kW-min/m$^2$) and a peak heat release rate of less than 65 kilowatts per square meter (kW/m$^2$) as measured using the method according to Part IV, OSU Heat Release of FAR/JAR 25.853, Amendment 25-116,
  v) a smoke density after 4 minutes (Ds-4) of equal to or less than 300 measured in accordance with ISO 5659-2 on a 3 mm thick plaque,
  vi) an integral of the smoke density as a function of time up to 4 minutes (VOF4) of equal to or less than 600 measured in accordance with ISO 5659-2 on a 3 mm thick plaque at 50 kW/m$^2$, or
  vii) a maximum average heat release (MAHRE) of equal to or less than 90 kW/m$^2$ measured in accordance with ISO 5660-1 on a 3 mm thick plaque at 50 kW/m$^2$.

17. An article comprising the composition of claim 1, selected from a molded article, a thermoformed article, an extruded film, an extruded sheet, a foamed article, a layer of a multi-layer article, a substrate for a coated article, and a substrate for a metallized article.

18. The article of claim 17, selected from a train or aircraft interior component, wherein the component is a seat component, an interior vertical surface selected from side walls, front walls, end-walls, room dividers, partitions, flaps, boxes, hoods, mirrors, lighting covers, a panel in an electrochromic window, an enclosure for an electronic device, a display screen, a protective cover for a display screen, a display unit, a television, a refrigerator door, a tray table, a trolley panel, a food cart, a magazine rack, and louvres; an interior door or lining for internal and external doors; a window insulation; a kitchen interior surface; an interior horizontal surface selected from ceiling paneling, flaps, boxes, hoods and louvres; a luggage storage area selected from overhead and vertical luggage racks, luggage containers and compartments; a driver's desk application selected from paneling and surfaces of driver's desk; an interior surface of gangways selected from interior sides of gangway membranes (bellows) and interior linings; a window frame; an optionally folding table with downward facing surface; an interior or exterior surface of air ducts, or a device for passenger information.

19. A method of manufacture of an article, comprising molding, extruding, foaming, or casting the composition of claim 1.

20. A multilayer sheet or film comprising
a base layer comprising a composition of claim 1; and
a cap layer disposed on a side of the base layer, wherein the cap layer comprises poly(ethylene terephthalate), poly(vinyl fluoride), poly(vinylidene fluoride), or a combination comprising at least one of the foregoing;
wherein the multilayer sheet has at least of the following properties:
i) a flame time of less than 15 seconds, a burn length of less than 6 inches, and a drip extinguishing time of less than 5 seconds, each measured using the method of FAR F25.5, in accordance with FAR 25.853(a) at a thickness of 3 mm;
ii) a 2 minute integrated heat release rate of less than or equal to 65 kilowatt-minutes per square meter (kW-min/m$^2$) and a peak heat release rate of less than 65 kilowatts per square meter (kW/m$^2$) as measured using the method according to Part IV, OSU Heat Release of FAR/JAR 25.853, Amendment 25-116;
iii) a maximum averaged rate of heat emission of less than or equal to 90 kW/m2 with 50 kW/m2 irradiance level test condition according to ISO 5660-1; or
iv) at a thickness of 1.0 mm, a smoke density of less than or equal to 200 after four minutes of burning according to ASTM E662-06.

\* \* \* \* \*